Aug. 1, 1933.                M. PIER ET AL                    1,920,886
              VALUABLE PRODUCTS FROM CARBONACEOUS SUBSTANCES
                         Filed March 24, 1928
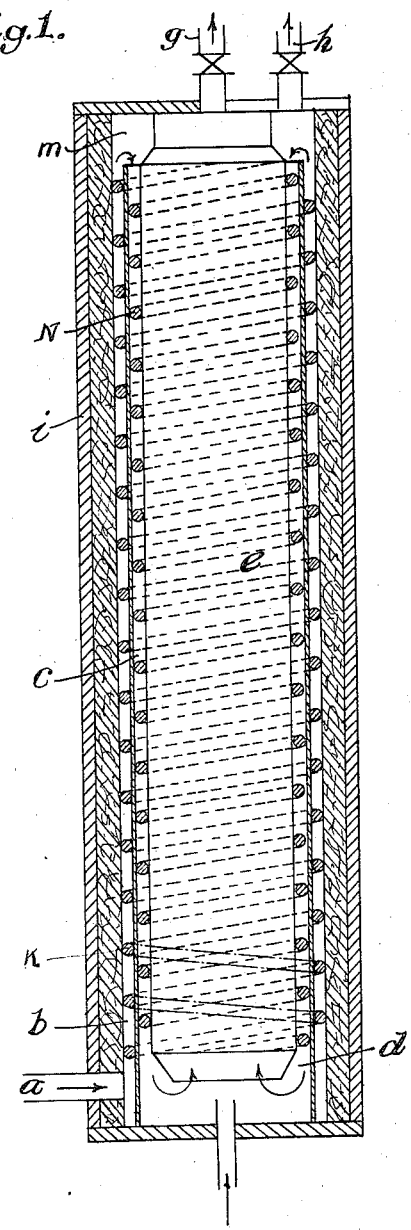
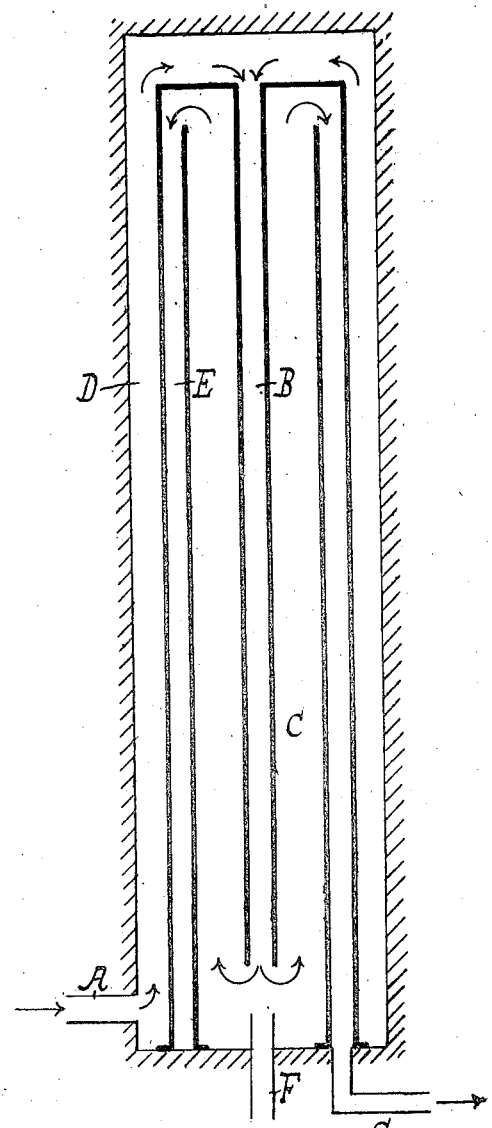
INVENTORS
MATHIAS PIER,
MAX WILDHAGEN AND
WALTER SCHUNCK
BY
ATTORNEYS Patented Aug. 1, 1933

1,920,886

UNITED STATES PATENT OFFICE

VALUABLE PRODUCTS FROM CARBONACEOUS SUBSTANCES

Mathias Pier, Heidelberg, Max Wildhagen, Mannheim, and Walter Schunck, Ludwigshafen-on-the-Rhine, Germany, assignors, by mesne assignments, to Standard- I. G. Company, Linden, N. J., a Corporation of Delaware Application March 24, 1928, Serial No. 264,444, and in Germany March 26, 1927

10 Claims. (Cl. 196—62)

When converting coal, tars, mineral oils, their distillation, extraction and conversion products, or other carbonaceous materials of any origin, into valuable liquid and other products by treatment with hydrogen, or gases furnishing hydrogen, these being equivalents for the purposes of the present invention, at an elevated temperature and under pressure and preferably in the presence of catalysts, the control of the reaction temperature is of substantial importance.

We have now found that the operation above referred to may be performed in a highly satisfactory manner if the working temperature during the treatment with hydrogen is controlled, partly in a direct manner by means of the substances, especially the hydrogenating gas, admitted into the reaction chamber, and simultaneously, partly in an indirect manner by means of substances, part or all of which take part in the reaction, or result therefrom, these being equivalents, both by substances taking part in the reaction and resulting therefrom or by a portion of such substances. The indirect transfer is preferably effected by forming a hot jacket by the incoming or outgoing substances, or both, between the reaction chamber and the wall which bears the pressure. This hot jacket may also serve for regeneration of heat inasmuch as the entering and issuing substances taking part in the reaction, or parts thereof or other substances, are led past each other therein, preferably in opposite directions so as to effect an exchange of heat between them. This arrangement is preferably such that the chambers adjoining the contact chamber are subdivided by partitions, such as embedded spirals, in such a way that the incoming and outgoing substances traverse a sinuous and accordingly very long course. These spirals may be formed in such a way that their surfaces are at the same time increased, as for example by recesses, superposed pieces of metal, and the like.

A suitable method of working according to the present invention consists, for example, in first admitting the hydrogenating gas, under pressure and preheated to about 400° centigrade in preheaters, into a chamber surrounding the contact chamber and being isolated from the outer shell of the reaction apparatus; in the said chamber it is then led in spirals from below upwards, and is subsequently passed into the reaction chamber through an electric heating device, which is mounted axially in and screened from the reaction chamber, or may also be situated in a forechamber leading to the reaction chamber. In this way, the gas acquires a temperature exceeding that of the reaction. It then comes into contact with the substances under treatment, such as tars, suspended coal and the like, which have only been heated to a temperature approaching the reaction temperature, for example, by direct heating in high-pressure coils, or indirectly by heating fluids circulating under pressure as for example, 200 atmospheres and being raised to the requisite temperature in any known and convenient manner. The products issuing from the reaction chamber enter a second annular chamber arranged concentrically with the reaction chamber, which may also be provided with spiral guides; or the said products may be led downward through pipes or the like, situated inside the first mentioned chamber, through which the incoming hydrogenation gas is passed, so that an exchange of heat is effected between the incoming gas and the outgoing substances.

According to this method of working the entire reaction chamber is surrounded by a hot jacket, whereby the reaction temperature is maintained constant for a large portion of the reaction vessel, fluctuations in temperature being counterbalanced and injurious radiation losses prevented. Contrary to other reactions such as the synthesis of ammonia, in which such accurate regulation of temperature is not so essential, these advantages are of fundamental importance in reactions, such as the destructive hydrogenation of coal, tars, mineral oils and the like, which are highly sensitive to the influence of temperature.

The process herein described may be employed in connection with gasified initial materials and if required with stationary catalysts or with liquid substances, these latter preferably being vigorously stirred and mixed with the catalysts. Suspensions of coal in tars, mineral oils, and the like, behave in the same manner as liquids.

Under certain circumstances it is preferable, when the hydrogenating gas, such as hydrogen, is employed for the indirect control of the temperature, that only a portion of it should be admitted into the reaction chamber, the bulk serving only for indirectly regulating the temperature and being maintained in circulation by pumping without passing through the reaction chamber. In such a case, as for example when operating with liquid initial materials, the portion of the hydrogen admitted into said chamber should be brought into sufficient contact with the liquid by vigorous stirring and preventing any excessive rate of flow of the substances taking part in the reaction. That portion of the hydrogenating gas which is not admitted into the said reaction chamber but only employed for the indirect control of temperature, may be passed into a second reaction chamber after being raised to the temperature required for that chamber. Before being admitted to the substances under treatment in the said second chamber, it may be mixed with the products, mixed with hydrogen, issuing from the first reaction chamber, especially when the operations in the second chamber are conducted in the gas state, for which a larger amount of hydrogen is required than when operating in the liquid state. The heat of the circulating gas should preferably be utilized in heat exchangers.

Materials which are likely to lead to injurious reactions, such as the formation of methane, deposition of carbon, and the like must be kept remote from all parts of the apparatus where they might cause such injurious reactions under the working conditions there prevailing.

Our said invention will be further illustrated with reference to the diagram, which shows cross-sections of two modifications of apparatus for carrying out the process of the said invention.

According to Figure 1, $a$ is a pipe for the admission of preheated hydrogenating gas. The said hydrogenating gas passes upwards in the form of a spiral through the passage $b$, the spiral form being produced by the partition $k$. When the hydrogenating gas has reached the point $m$ part of it passes downwards in the passage $c$ and is again compelled to take a spiral path by the arrangement of the partition N in the said passage $c$. When the said gases have reached the bottom of the passage at $d$, they pass into the reaction vessel $e$. Part of the said hydrogenating gases may, if desired, be removed by way of the pipe $h$. The carbonaceous materials to be subjected to destructive hydrogenation are introduced by way of the pipe $f$. Gases and the reaction products together with any residues contained therein are taken off from the vessel by way of the pipe $g$. $i$ is the pressure-bearing wall of the said vessel and $o$ is heat-insulating material.

According to Figure 2, the reduction gas is introduced into the reaction vessel at $a$ and streams as shown by the arrow through the jacket space $b$ and then through the pipe of the heater $k$ arranged centrally therein, the said heater being heated electrically, into the reaction chamber $e$. The carbonaceous substances to be treated such as substances of the nature of coal, tars and the like are admitted at $f$. The reaction products stream through the jacket space $c$ and leave the reaction vessel at $g$.

What we claim is:

1. A process for the conversion of carbonaceous substances into liquid hydrocarbons by destructive hydrogenation with hydrogen at an elevated temperature and at a pressure of more than atmospheric, which comprises preheating the said hydrogen, then bringing it into indirect heat exchange with the hot substances under treatment, thereby heating it to a temperature approaching the reaction temperature, thereupon heating it further to a temperature exceeding the reaction temperature and then bringing it into direct heat exchange with the said substances under treatment.

2. A process for the conversion of carbonaceous substances into liquid hydrocarbons by destructive hydrogenation with hydrogen at an elevated temperature and at a pressure of more than atmospheric, which comprises preheating the said hydrogen, then bringing it into indirect heat exchange with the hot substances under treatment, thereby heating it to a temperature approaching the reaction temperature, thereupon heating it further to a temperature exceeding the reaction temperature by means of an electric heating device and then bringing it into direct heat exchange with the said substances under treatment 3. A process for the conversion of carbonaceous substances into liquid hydrocarbons by destructive hydrogenation with hydrogen at an elevated temperature and at a pressure of more than atmospheric, which comprises preheating the said hydrogen, then bringing it into indirect heat exchange with the hot substances issuing from the reaction, heating it further to a temperature exceeding the reaction temperature and then bringing it into direct heat exchange with the said substances under treatment.

4. A process for the conversion of carbonaceous substances into liquid hydrocarbons by destructive hydrogenation with hydrogen at an elevated temperature and at a pressure of more than atmospheric, which comprises preheating the said hydrogen, then bringing it into indirect heat exchange with the hot substances, issuing from the reaction, heating it further to a temperature exceeding the reaction temperature by means of an electric heating and then bringing it into direct heat exchange with the said substances under treatment.

5. A process for the conversion of carbonaceous substances into liquid hydrocarbons by destructive hydrogenation with hydrogen at an elevated temperature and at a pressure of more than atmospheric, which comprises preheating the said hydrogen, then bringing it into indirect heat exchange with the hot substances issuing from the reaction, and then with the hot substances under treatment, thereby heating it to a temperature approaching the reaction temperature, thereupon heating it further to a temperature exceeding the reaction temperature and then bringing it into direct heat exchange with the said substances under treatment.

6. Process for the destructive hydrogenation of distillable carbonaceous materials with hydrogen at a pressure sufficient for the conversion which comprises passing a mixture of hydrogen and carbonaceous materials at a temperature sufficient for the conversion through one part of a divided reaction space, passing the hot mixture after its exit from said part of said space through another part of said space in a direction counter-current to the flow of the mixture in said first part and in indirect heat contact with the mixture in the first part of said space.

7. Process for the destructive hydrogenation of distillable carbonaceous materials with hydrogen at a pressure sufficient for the conversion which comprises passing a mixture of hydrogen and carbonaceous materials at a temperature sufficient for the conversion through one part of a divided reaction space having a catalyst located therein, passing the hot reaction mixture after its exit from said part through another part of said space also having a catalyst therein in a direction counter-current to the flow of the mixture in said first part and in indirect heat contact with the mixture in the first part of said space.

8. Process for the destructive hydrogenation of distillable carbonaceous materials with hydrogen at a temperature and pressure sufficient for the conversion which comprises passing a hot stream of hydrogen in contact with a hot stream of carbonaceous materials through a reaction space to effect said conversion, passing the hot reaction mixture after its exit from said space in a stream opposite to the path of movement of said reacting materials, passing a stream of hydrogen first in indirect contact with and counter-current to the path of said hot reaction mixture and then counter-current to and in indirect contact with the hot stream of said reacting materials, and injecting the hydrogen at a temperature above that necessary for the conversion into the reaction space with additional hot carbonaceous material.

9. Process for the destructive hydrogenation of distillable carbonaceous materials with hydrogen at a temperature and pressure sufficient for the conversion which comprises passing a hot stream of hyrogen in contact with a hot stream of carbonaceous materials through a reaction space to effect said conversion, passing the hot reaction mixture after its exit from said space in a stream opposite to the path of movement of said reacting materials, passing a stream of hydrogen first in indirect contact with and counter-current to the path of said hot reaction mixture and then counter-current to and in indirect contact with the hot stream of said reacting materials while imparting additional outside heat to the hot stream of hydrogen to thereby raise its temperature above that required for the conversion, and injecting the so-heated hydrogen into the reaction space with additional hot carbonaceous material.

10. Process for the destructive hydrogenation of distillable carbonaceous materials with hydrogen at a temperature and pressure sufficient for the conversion which comprises passing a hot stream of hydrogen in contact with a hot stream of carbonaceous materials longitudinally through a reaction space open at the end toward which said streams are caused to travel, passing the hot reaction mixture through said end after it has traversed said space and thence in a stream parallel but opposite to the path of movement of said reacting materials while in indirect contact therewith, passing a stream of hydrogen first in indirect contact with and countercurrent to the path of said hot reaction mixture and then counter-current to and in indirect contact with the hot stream of said reacting materials while impairing additional outside heat to the hot stream of hydrogen to thereby raise its temperature above that required for the reaction, and injecting the so-heated hydrogen into the reaction space with additional hot carbonaceous material.

In testimony whereof we have hereunto set our hands.

MATHIAS PIER.
MAX WILDHAGEN.
WALTER SCHUNCK.